(12) United States Patent
Riga et al.

(10) Patent No.: US 11,032,615 B2
(45) Date of Patent: *Jun. 8, 2021

(54) DETERMINING AN END SCREEN TIME FOR DISPLAYING AN END SCREEN USER INTERFACE

(71) Applicant: Verizon Patent and Licensing Inc., Basking Ridge, NJ (US)

(72) Inventors: Benigno Riga, Scotts Valley, CA (US); Kyrylo Panarin, Flower Mound, TX (US); Pari Chidambaram, Frisco, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/946,393

(22) Filed: Jun. 19, 2020

(65) Prior Publication Data

US 2020/0322686 A1 Oct. 8, 2020

Related U.S. Application Data

(63) Continuation of application No. 16/367,061, filed on Mar. 27, 2019, now Pat. No. 10,715,871.

(51) Int. Cl.
| | |
|---|---|
| *H04N 5/445* | (2011.01) |
| *H04N 21/4725* | (2011.01) |
| *H04N 21/845* | (2011.01) |
| *H04N 21/6587* | (2011.01) |
| *G06N 20/20* | (2019.01) |
| *G06N 7/00* | (2006.01) |

(52) U.S. Cl.
CPC .......... *H04N 21/4725* (2013.01); *G06N 7/00* (2013.01); *G06N 20/20* (2019.01); *H04N 21/6587* (2013.01); *H04N 21/8456* (2013.01)

(58) Field of Classification Search
CPC .......... H04N 21/4725; H04N 21/8456; H04N 21/6587
USPC .......................................................... 725/60
See application file for complete search history.

(56) References Cited

U.S. PATENT DOCUMENTS

| | | | |
|---|---|---|---|
| 8,037,504 | B2 | 10/2011 | Jerding et al. |
| 8,861,935 | B2 | 10/2014 | Murthy et al. |
| 2001/0025316 | A1 | 9/2001 | Oh |
| 2002/0174430 | A1 | 11/2002 | Ellis et al. |
| 2003/0067554 | A1 | 4/2003 | Klarfeld et al. |
| 2003/0163823 | A1 | 8/2003 | Logan et al. |
| 2004/0078822 | A1 | 4/2004 | Breen et al. |
| 2008/0256255 | A1 | 10/2008 | Mordovskoi et al. |

(Continued)

*Primary Examiner* — Michael B. Pierorazio

(57) ABSTRACT

A content platform can receive information identifying a plurality of exit times, in an on-demand content element, associated with respective user-initiated exit events. The plurality of exit times can be based on a time duration of the on-demand content element. The content platform can generate an exit time distribution based on the plurality of exit times, and can identify a maximum exit time density in the exit time distribution and a maximum exit time density gradient in the exit time distribution. The content platform can determine, using a machine-learning regression model, an end screen time in the on-demand content element based on the maximum exit time density and the maximum exit time density gradient. The content platform can generate an instruction to display an end screen user interface at the end screen time during playback of the on-demand content element.

20 Claims, 7 Drawing Sheets

(56) References Cited

U.S. PATENT DOCUMENTS

| | | |
|---|---|---|
| 2009/0015671 A1 | 1/2009 | Addy |
| 2010/0157050 A1 | 6/2010 | Drive et al. |
| 2011/0107362 A1 | 5/2011 | Reilly et al. |
| 2013/0311575 A1 | 11/2013 | Woods et al. |
| 2014/0049691 A1 | 2/2014 | Burdzinski et al. |
| 2014/0196082 A1 | 7/2014 | Maruyama et al. |
| 2014/0258449 A1 | 9/2014 | Holden et al. |
| 2014/0351847 A1 | 11/2014 | Ochiai et al. |
| 2015/0016800 A1 | 1/2015 | Bowers et al. |
| 2015/0067732 A1 | 3/2015 | Howe et al. |
| 2015/0131006 A1 | 5/2015 | Uno |
| 2015/0150042 A1 | 5/2015 | Hwang et al. |
| 2015/0358666 A1 | 12/2015 | Atake et al. |
| 2018/0130503 A1 | 5/2018 | Hirajoh |
| 2018/0220168 A1 | 8/2018 | Han |
| 2018/0288483 A1 | 10/2018 | Wang |
| 2019/0028776 A1 | 1/2019 | Arai et al. |
| 2019/0045269 A1 | 2/2019 | Fujimori |
| 2019/0082214 A1 | 3/2019 | Kim et al. |
| 2019/0090025 A1 | 3/2019 | Chesson |
| 2019/0335245 A1 | 10/2019 | Sprenger et al. |

DETERMINING AN END SCREEN TIME FOR DISPLAYING AN END SCREEN USER INTERFACE

RELATED APPLICATION

This application is a continuation of U.S. patent application Ser. No. 16/367,061, filed Mar. 27, 2019, which is incorporated herein by reference.

BACKGROUND

Video-on-demand can be a technique of providing content, which allows a user to view and/or listen to the content whenever the user chooses rather than at a scheduled time. The content can be streamed to various devices (e.g., a set-top box, a computer, and/or the like), which allows the content to be viewed in real time, downloaded to another device, and/or the like.

DETAILED DESCRIPTION OF PREFERRED EMBODIMENTS

Figure 1A:
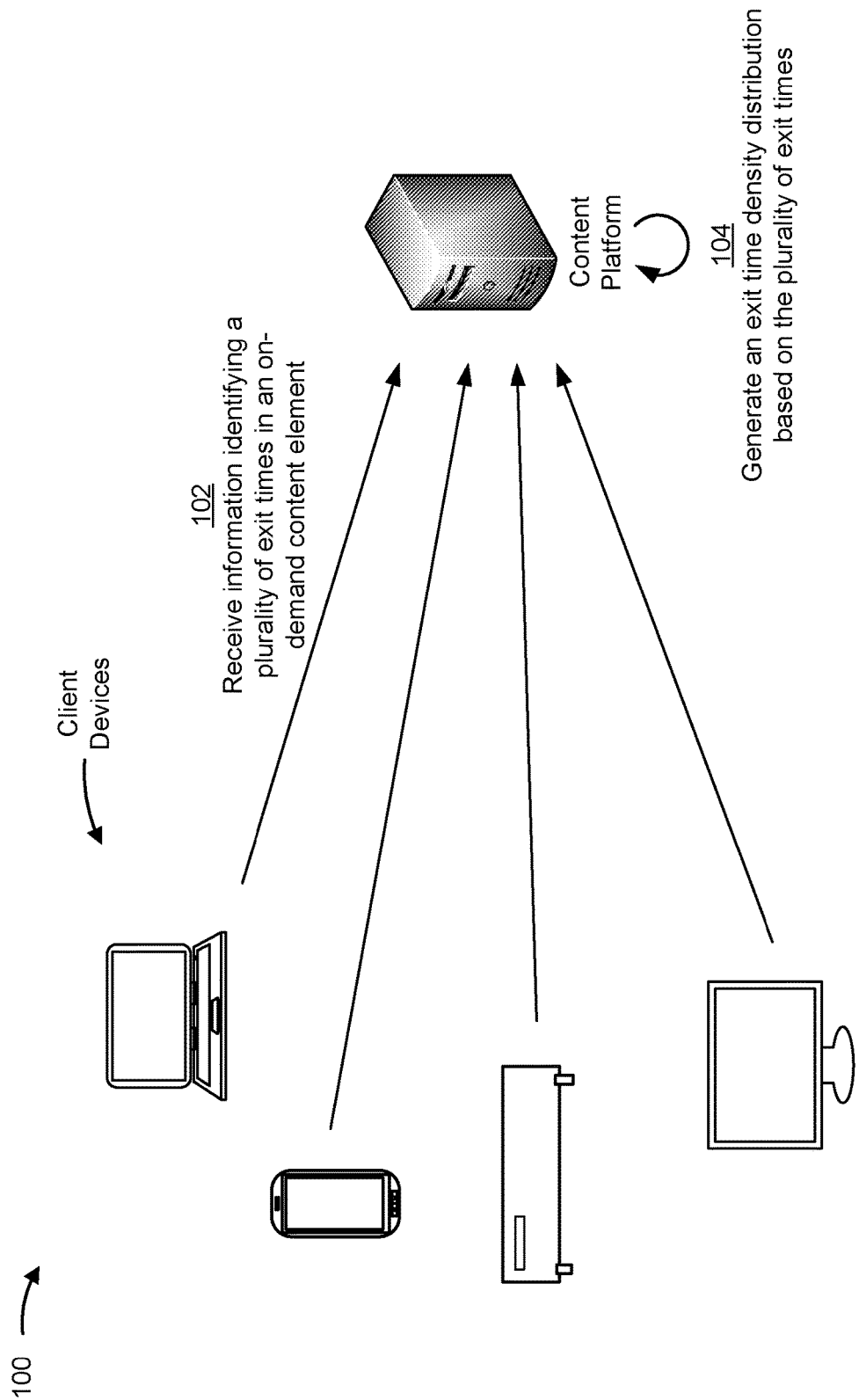
FIGS. 1A-1D is a diagram of one or more example implementations described herein.

The following detailed description of example implementations refers to the accompanying drawings. The same reference numbers in different drawings can identify the same or similar elements.

A user can use a client device to access on-demand content from a plurality of content providers. The on-demand content can include a plurality of content elements, such as on-demand movies, on-demand videos, on-demand television shows or episodes, on-demand documentaries, and/or the like, that can be viewed and/or downloaded at any particular time. In some cases, when playing an on-demand content element, the client device can display an end screen user interface as an overlay on the on-demand content element. The end screen user interface can display options for the user to provide input to cause the client device to play another on-demand content element (e.g., a next episode in a television series), to view related and/or similar on-demand content elements, and/or the like. Some techniques for displaying the end screen user interface include displaying the end screen user interface when the ending credits for the on-demand content element start rolling, displaying the end screen user interface when a particular amount of time remains in the on-demand content element (e.g., when there are 30 seconds remaining in the on-demand content element), or displaying the end screen user interface when a particular percentage of the on-demand content element has been played (e.g., 90% of the on-demand content element). Moreover, if an end screen user interface is displayed too late, then the chances that a user will stop watching the content element prior to the end screen user interface being display increases, which can cause a decrease (or absence altogether) in user engagement with the end screen user interface.

The above-described techniques for displaying an end screen user interface can result in inefficient and/or inappropriate placement of the end screen user interface in the time duration of an on-demand content element. For example, an on-demand content element can start rolling the ending credits while a final or concluding scene of the on-demand content element is playing. If an end screen user interface were to be displayed based on rolling the ending credits, the end screen user interface can at least partially obscure, distract from, and/or otherwise interrupt the final or concluding scene. Moreover, some on-demand content elements include additional content after the ending credits roll, such as bloopers, outtakes, and/or teasers or spoilers for future content (e.g., sequels, prequels, etc.), and the additional content can also be interrupted or skipped over entirely due to the display of the end screen user interface at the beginning of the ending credits roll. As another example, the duration of the ending credits roll can vary from on-demand content element to on-demand content element. If an end screen user interface were to be displayed based on a particular amount of time remaining in an on-demand content element, or based on a percentage of an on-demand content element having been played, the end screen user interface can be displayed too early in some on-demand content elements and too late in other on-demand content elements. In the case where an end screen user interface is displayed too late in an on-demand content element, the ability of the user to initiate playback of another on-demand content element and/or explore similar and/or related on-demand content elements can be delayed, which can cause network resources, memory resources, and/or processing resources to be wasted on playing portions of the on-demand content element that are of minor or no interest to the user.

Some implementations described herein provide a content platform that is capable of determining an end screen time for displaying an end screen user interface during playback of an on-demand content element. The content platform is capable of using machine-learning techniques to determine the end screen time based on crowd-sourced and/or user-provided data associated with the on-demand content element. The crowd-sourced and/or user-provided data can include a plurality of exit times, in the on-demand content element, associated with respective user-initiated exit events. The plurality of exit times can be based on a time duration of the on-demand content element. In this way, the content platform can use the plurality of exit times to determine an appropriate and efficient end screen time for displaying the end screen user interface during playback of the on-demand content element, which reduces the likelihood that the end screen user interface will interrupt playback of the on-demand content element and/or reduces the amount of network resources, memory resources, increases the likelihood that users will interact with the end screen user interface to continue watching related content, and/or processing resources that are wasted on playing portions of the on-demand content element that are likely to be minor or of no interest to users.

FIGS. 1A-1D are diagrams of one or more example implementations 100 described herein. In some implementations, example implementation(s) 100 can be an example of determining an end screen time for displaying an end screen user interface. As shown in FIGS. 1A-1D, example implementation(s) 100 can include a plurality of client devices (collectively referred to as "client devices" and individually as "client device") and a content platform.

In some implementations, the content platform can store various types of content, such as on-demand content (e.g., a plurality of content elements), web-based content (e.g., a web page associated with a particular on-demand content element, a home page associated with an on-demand content provider, and/or the like), and/or the like. In some implementations, the content platform can be associated with a particular on-demand content provider (e.g., a content provider that generates, is associated with, and/or provides, on-demand content). In some implementations, the content platform can be on-demand content provider agnostic in that the content platform stores and provides an on-demand content service for on-demand content associated with a plurality of on-demand content providers.

In some implementations, the content platform can send data to and/or receive data from the client devices. In some implementations, a client device can be a device capable of generating a GUI for display on a display of the client device (or for display on a standalone display or a display of another device, such as a touch screen display, a monitor, a television, and/or the like), capable of receiving inputs associated with the GUI, capable of sending data to and/or receiving data from the content platform, and/or the like. The client device can include a mobile phone, a desktop computer, a laptop, a server device, a tablet computer, a set-top box, a media streaming device, a smart device (e.g., a smart television, a smartphone, a smartwatch, and/or the like), and/or the like.

The GUI can be associated with an on-demand content service and can be part of an application, a web interface, and/or the like. In some implementations, the inputs associated with the GUI can include one or more user-provided inputs to navigate the GUI to browse on-demand content elements hosted by the on-demand content service, a user-provided input to select an on-demand content element to initiate playback of the on-demand content element, a user-initiated exit event associated with an on-demand content element, and/or the like. A user-initiated event can include a user-provided instruction, received as input at a client device, to exit or terminate the playback of an on-demand content element. In some implementations, a user-initiated exit event can cause the client device to display a home screen or another screen of the GUI of the on-demand content service (e.g., can cause the client device to terminate playback of the on-demand content element and return to the home screen), can cause the client device to display another on-demand content element (e.g., can cause the client device to initiate playback of a next episode in a television series associated with the on-demand content element, can cause the client device to initiate playback of a similar and/or related on-demand content element, and/or the like), and/or the like.

In some implementations, a client device can store information identifying an exit time associated with a user-initiated exit event that is associated with an on-demand content element, and can provide, to the content platform, the information identifying the exit time. An exit time can be a time, in the on-demand content element, at which the user-initiated event occurred. The exit time can be based on a time duration of the on-demand content element. For example, the exit time can be relative to an end of the time duration of the on-demand content element (e.g., 30 seconds remaining in the time duration of the on-demand content element). As another example, the exit time can be relative to a start time of the time duration of the on-demand content element (e.g., 53 minutes 35 seconds into the time duration of the on-demand content element). As another example, the exit time can be a percentage or ratio of the time duration of the on-demand content element (e.g., 95% into the time duration of the on-demand content element, 0.97 of the time duration of the on-demand content element, and/or the like).

As shown in FIG. 1A, and by reference number 102, the client devices can transmit, to the content platform, information identifying a plurality of exit times, in an on-demand content element, associated with respective user-initiated exit events. The content platform can receive the plurality of exit times and can determine, based on the plurality of exit times, an end screen time for displaying an end screen user interface during playback of the on-demand content element.

In some implementations, a client device can transmit information identifying an exit time based on the occurrence of an associated user-initiated exit event. In some implementations, a client device can transmit information identifying an exit time based on receiving, from the content platform, a request or an instruction to provide the information identifying the exit time. In some implementations, a client device can transmit information identifying an exit time based on a time duration. The time duration can include, for example, a particular amount of time after the on-demand content element was made available for viewing on the on-demand content service. In this case, the content platform can specify, for a newly hosted on-demand movie or on-demand television episode, that client devices are to wait until after the expiration of the time duration to transmit information identifying exit times associated with the newly hosted on-demand movie or on-demand television episode. Moreover, the content platform can specify a particular time of day that client devices are to transmit the information identifying the exit times so that the information is transmitted on off-peak and/or low-demand streaming times to avoid interruptions in on-demand content streaming that would otherwise result from the network resource consumption due to transmitting the information.

In some implementations, the content platform can limit the quantity of exit times that a particular client device can provide for a particular on-demand content element. For example, the content platform can limit the quantity of exit times that a particular client device can provide for a particular on-demand content element to one exit time, five exit times, and/or the like. In some implementations, the content platform can limit the quantity of exit times to a particular address (e.g., an Internet protocol (IP) address, a physical address associated with a residence or household, and/or the like), may limit the quantity of exit times to a particular subscriber account, and/or the like.

As further shown in FIG. 1A, and by reference number 104, the content platform can generate an exit time distribution based on the plurality of exit times. The exit time distribution can include an analysis of exit time densities for the time duration of the on-demand content element. That is, the exit time distribution can group the plurality of exit times such that the density of exit times, along the time duration of the on-demand content element, can be determined. In some implementations, the exit time distribution can include a histogram of the plurality of exit times, a Kernel Density Estimation (KDE) of the plurality of exit times, and/or another type of analysis, of the density distribution of the plurality of exit times.

In some implementations, the content platform can group exit times into exit time groups based on a time granularity for the exit time distribution. In some implementations, the content platform can group exit times that occur within a particular time interval (e.g., can group exit times that occur within the same one-second time interval, the same three-second time interval, and/or the like). As an example, exit times that fall between 0:15 seconds and 0:14 seconds from the end of the time duration of the on-demand content element can be grouped together and considered for the exit time distribution to have occurred during the same time in the time duration of the on-demand content element. In some implementations, the content platform can group exit times that occur within a threshold percentage or ratio of the time duration of the on-demand content element. As an example, exit times that fall between 0.91 and 0.92 of the time duration of the on-demand content element can be grouped together and considered for the exit time distribution to have occurred during the same time in the time duration of the on-demand content element.

Figure 1B:
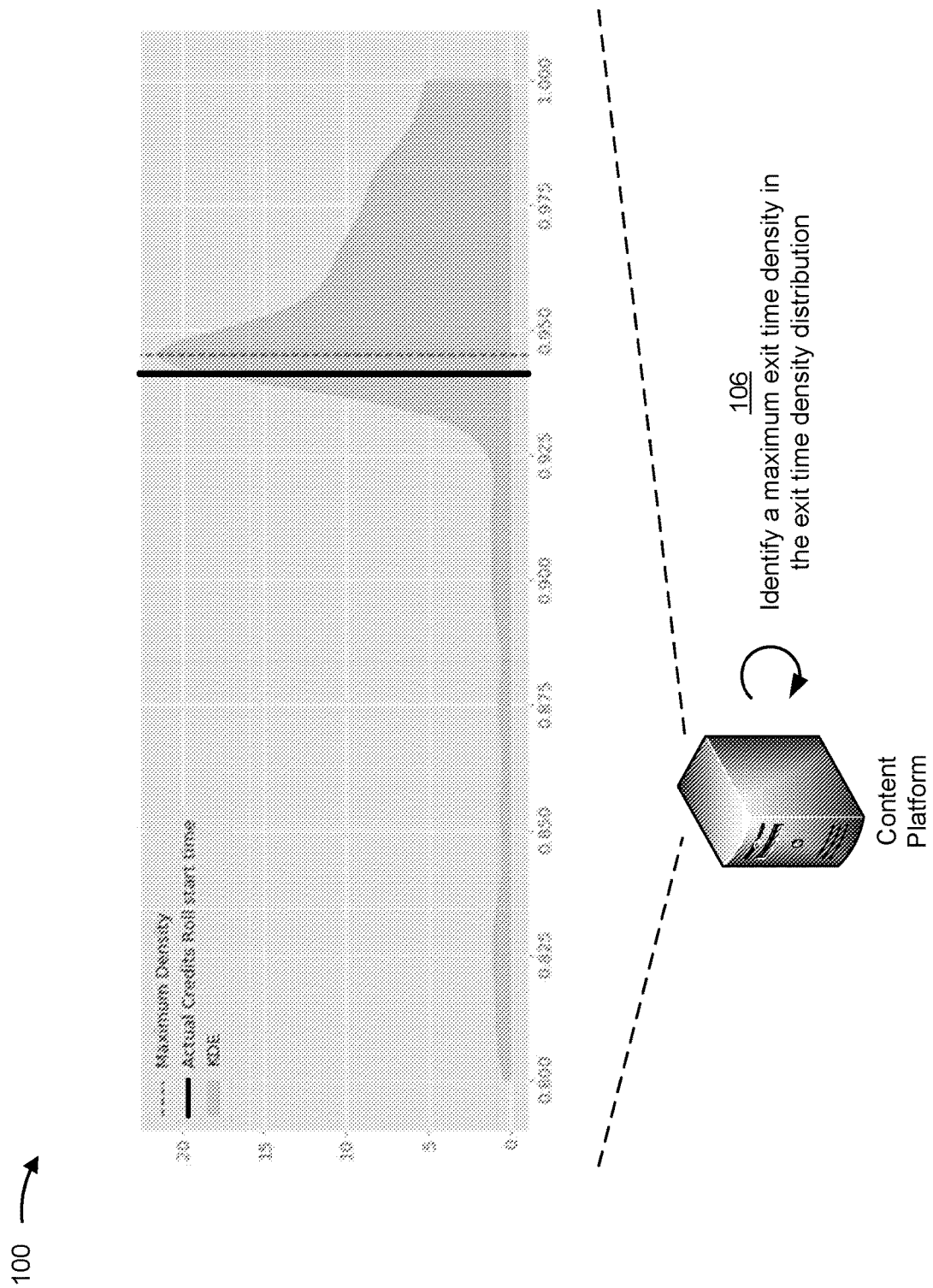

An example exit time distribution is shown in FIG. 1B. As shown in FIG. 1B, the exit time distribution can be plotted along a ratio of the time duration of the on-demand content element. However, the exit time distribution being plotted along the ratio of the time duration of the on-demand content element is an example, and the exit time distribution can be plotted along the actual time duration of the on-demand content element (e.g., in second, minutes, hours, and/or fractions of seconds), the percentage of the time duration of the on-demand content element, and/or the like.

As further shown in FIG. 1B, and by reference number 106, the content platform can identify a maximum exit time density in the exit time distribution. The maximum exit time density can correspond to an exit time (or exit time group) at which a greatest quantity of exit times occur in the exit time distribution. As shown in FIG. 1B, the maximum exit time density can occur after a time at which the ending credits start to roll. However, the maximum exit time density can occur before a time at which the ending credits start to roll or can occur at the time at which the ending credits start to roll depending on when the largest density of user-initiated exit events occurs.

In some implementations, anomalies in the exit time data can occur. For example, a relatively large amount of user-initiated exit events can occur near the beginning of the on-demand content element due to users accidently and/or inadvertently terminating playback of the on-demand content element, due to users selecting to play the wrong on-demand content element, and/or the like. In this case, the content platform can filter out exit times that occur outside of a particular time window, in the time duration of the on-demand content element, by removing the exit times from the exit time distribution. The time window can be, for example, located at or near the end of the time duration of the on-demand content element. For example, the time window can include the last minute of the on-demand content element, the last five minutes of the on-demand content element, and/or the like. As another example, the time window can include the last 3% of the time duration of the on-demand content element, the last 5% of the time duration of the on-demand content element, and/or the like.

In some implementations, the duration of the time window can vary from on-demand content element to on-demand content element. In some implementations, the duration of the time window can be the same for all on-demand content elements. In some implementations, the duration of the time window can be different for different types of on-demand content elements (e.g., on-demand movies can be associated with a first duration, on-demand television episodes can be associated with a second duration, and so on, and/or the like). In some implementations, the duration of the time window can be based on a time duration of the on-demand content element. For example, the duration can be increase as time duration increases, can decrease as time duration decreases, and/or the like.

Figure 1C:
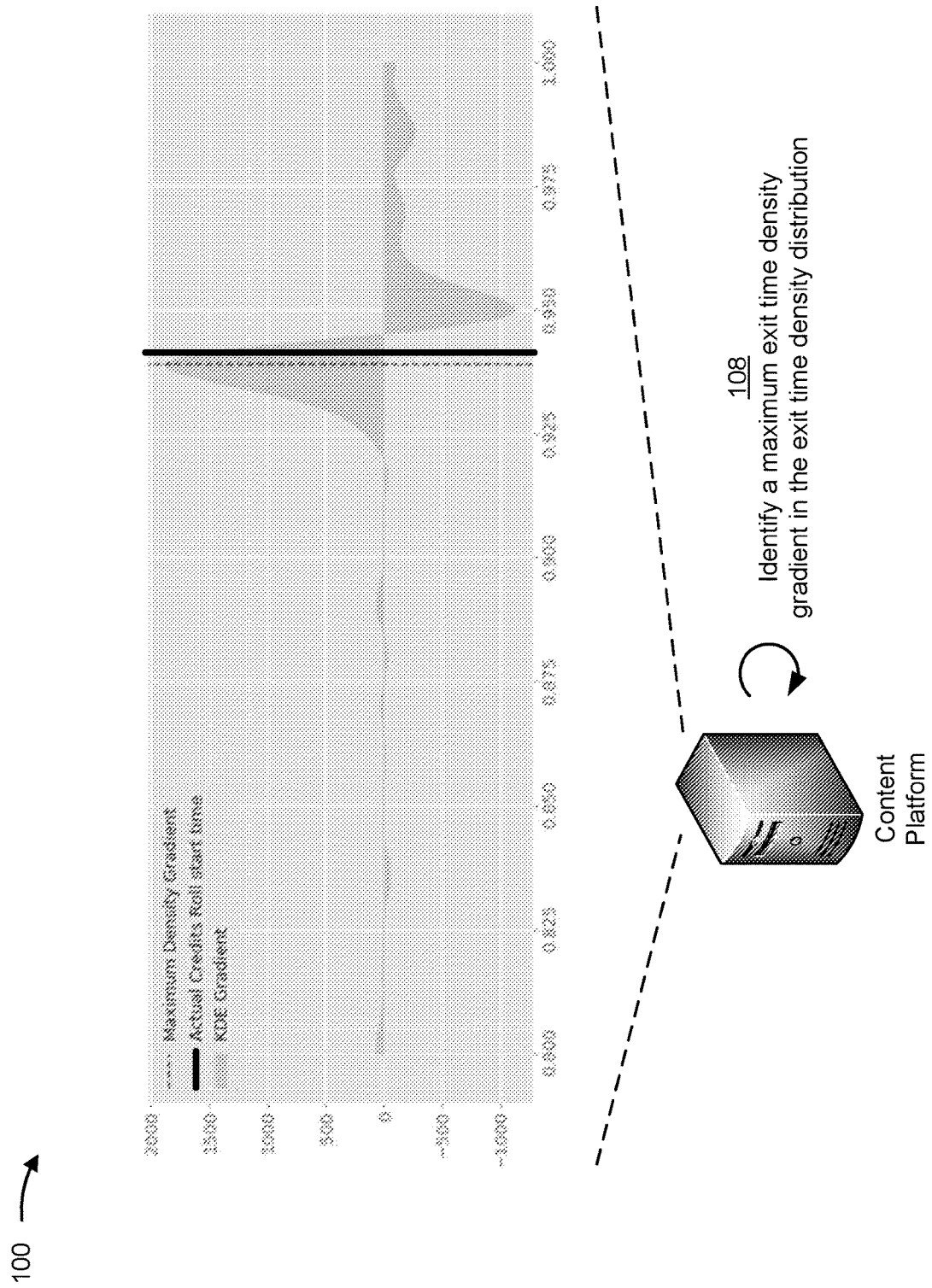

As shown in FIG. 1C, and by reference number 108, the content platform can identify a maximum exit time density gradient in the exit time distribution. The maximum exit time density gradient can correspond to an exit time (or exit time group) at which a greatest increase in exit time density occurs in the exit time distribution. In this case, the content platform can identify the maximum exit time density gradient by identifying an exit time (or exit time group) at which a greatest positive slope of the exit time distribution occurs. FIG. 1C illustrates an example plot of exit time density gradient over the time duration of the on-demand content element. In the example shown in FIG. 1C, the maximum exit time density gradient can occur prior to a time at which the ending credits start to roll. However, the maximum exit time density gradient can occur before a time at which the ending credits start to roll or can occur at the time at which the ending credits start to roll depending on when the largest density increase of user-initiated exit events occurs. Moreover, in some implementations, the content platform can filter out exit time gradients that occur outside of a time window, similar as described above for filtering out exit times that occur outside of the time window.

Figure 1D:
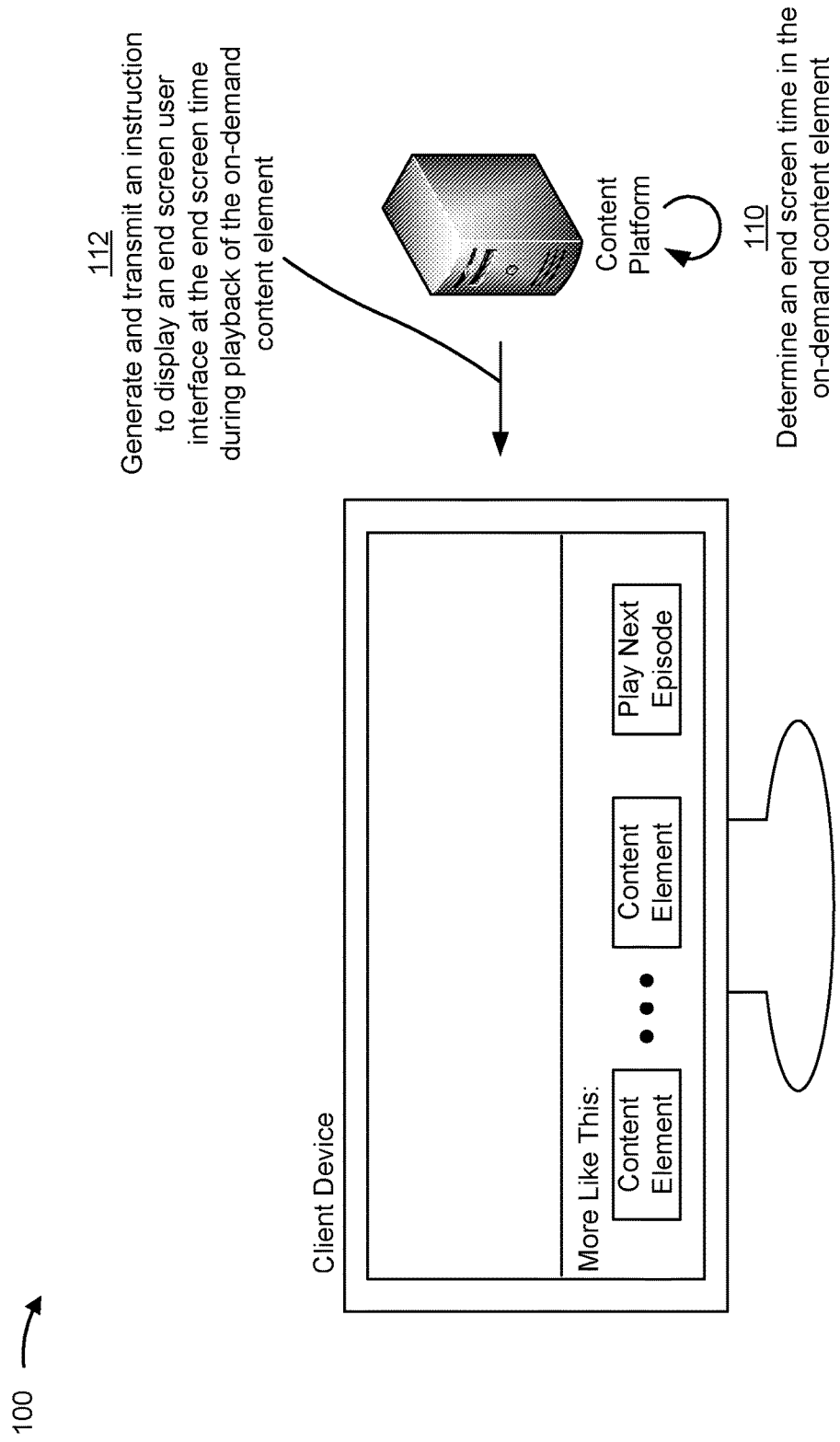

As shown in FIG. 1D, and by reference number 110, the content platform can determine an end screen time in the on-demand content element. As described above, the end screen time can be a time, in the time duration of the on-demand content element, at which an end screen user interface is to be displayed during playback of the on-demand content element.

In some implementations, the content platform can determine the end screen time based on the maximum exit time density and the maximum exit time density gradient. For example, the content platform can determine the end screen time using the exit time (or exit time group) corresponding to the maximum exit time density, and the exit time (or exit time group) corresponding to the maximum exit time density gradient, in a machine-learning algorithm or model. The machine-learning algorithm or model can include a machine-learning regression model and/or another type of machine-learning model. An example machine-learning regression model can include:

$$T_{end\ screen} = c_0 + c_1 * T_{max\ density} + c_2 * T_{max\ density\ gradient}$$

where $T_{end\ screen}$ is the end screen time, $T_{max\ density}$ is the exit time (or exit time group) corresponding to the maximum exit time density, $T_{max\ density\ gradient}$ is the exit time (or exit time group) corresponding to the maximum exit time density gradient, $c_0$ is a bias term, and $c_1$ and $c_2$ are machine-learning regression model coefficients. The machine-learning regression model can be trained such that coefficients are selected to penalize negative errors (such as when an end screen time prediction is less than an expected end screen time) while also penalizing large absolute errors. The above-described machine-learning regression model is an example only, and other machine-learning regression models and/or machine-learning models and algorithms can be used to determine the end screen time.

In some implementations, the operations and/or techniques, described above in reference to reference numbers 104-110, can be performed by the content platform "on the fly" in that the operations and/or techniques can be performed in response to a user selecting the on-demand content element for play back. In some implementations, the operations and/or techniques, described above in reference to reference numbers 104-110, can be performed by the content platform "offline" in that the operations and/or techniques can be performed without a particular request or query for the end screen time. In this case, the content element can associate the end screen time with the on-demand content element such that client devices display the end screen user interface at the end screen time during playback of the on-demand content element. The content element can store the association in a data structure at the content platform and/or another location. The data structure can include an electronic database, an electronic file (e.g., a structured electronic file, such as an extensible markup language (XML) file, a JavaScript object notation (JSON) file, and/or the like), metadata associated with the on-demand content element, and/or the like. The association of the end screen time with the on-demand content element can function as an instruction for client devices to display the end screen user interface at the end screen time during playback of the on-demand content element.

As further shown in FIG. 1D, and by reference number 112, the content platform can generate and transmit, to a client device, an instruction to display the end screen user interface at the end screen time during playback of the on-demand content element. In some implementations, the content platform can generate and transmit the instruction based on the client device initiating playback of the on-demand content element, based on the playback of the on-demand content element approaching the end screen time (e.g., within 30 seconds of the end screen time during playback of the on-demand content element), and/or the like. As an example, a user of the client device can select (e.g., via a GUI associated with an on-demand content service) the on-demand content element for viewing. Based on the selection of the on-demand content element, the client device can transmit, to the content platform, a request to stream or download the on-demand content element from the content platform. The content platform can receive the request and can stream or transfer, to the client device and based on the request, the on-demand content element along with an indication of the end screen time associated with the on-demand content element (which can function as an implicit instruction to display the end screen user interface, or an explicit instruction can be transmitted along with the indication).

The client device can, accordingly, display the end screen user interface at the end screen time during playback of the on-demand content element. FIG. 1D illustrates an example end screen user interface that can be displayed as an overlay on the on-demand content element. Other configurations, quantities, and/or designs of end screen user interfaces and/or the like can be displayed. As shown in FIG. 1D, the example end screen user interface can include a section that includes a display of a notification to initiate playback of another on-demand content element (e.g., a "Play Next Episode" notification that the user can select via the GUI), a section that includes a display of one or more suggested similar content elements and/or one or more suggested related content elements (e.g., a "More Like This" section) that the user can select via the GUI, and/or the like.

In this way, the content platform is capable of using machine-learning techniques to determine an end screen time based on crowd-sourced and/or user-provided data associated with an on-demand content element. The crowd-sourced and/or user-provided data can include a plurality of exit times, in the on-demand content element, associated with respective user-initiated exit events. The plurality of exit times can be based on a time duration of the on-demand content element. In this way, the content platform can use the plurality of exit times to determine an appropriate and efficient end screen time for displaying the end screen user interface during playback of the on-demand content element, which reduces the likelihood that the end screen user interface will interrupt playback of the on-demand content element, increases the likelihood that users will interact with the end screen user interface to continue watching related content, and/or reduces the amount of network resources, memory resources, and/or processing resources that are wasted on playing portions of the on-demand content element that are likely to be minor or of no interest to users.

As indicated above, FIGS. 1A-1D are provided as one or more examples. Other examples can differ from what is described with regard to FIGS. 1A-1D.

Figure 2:
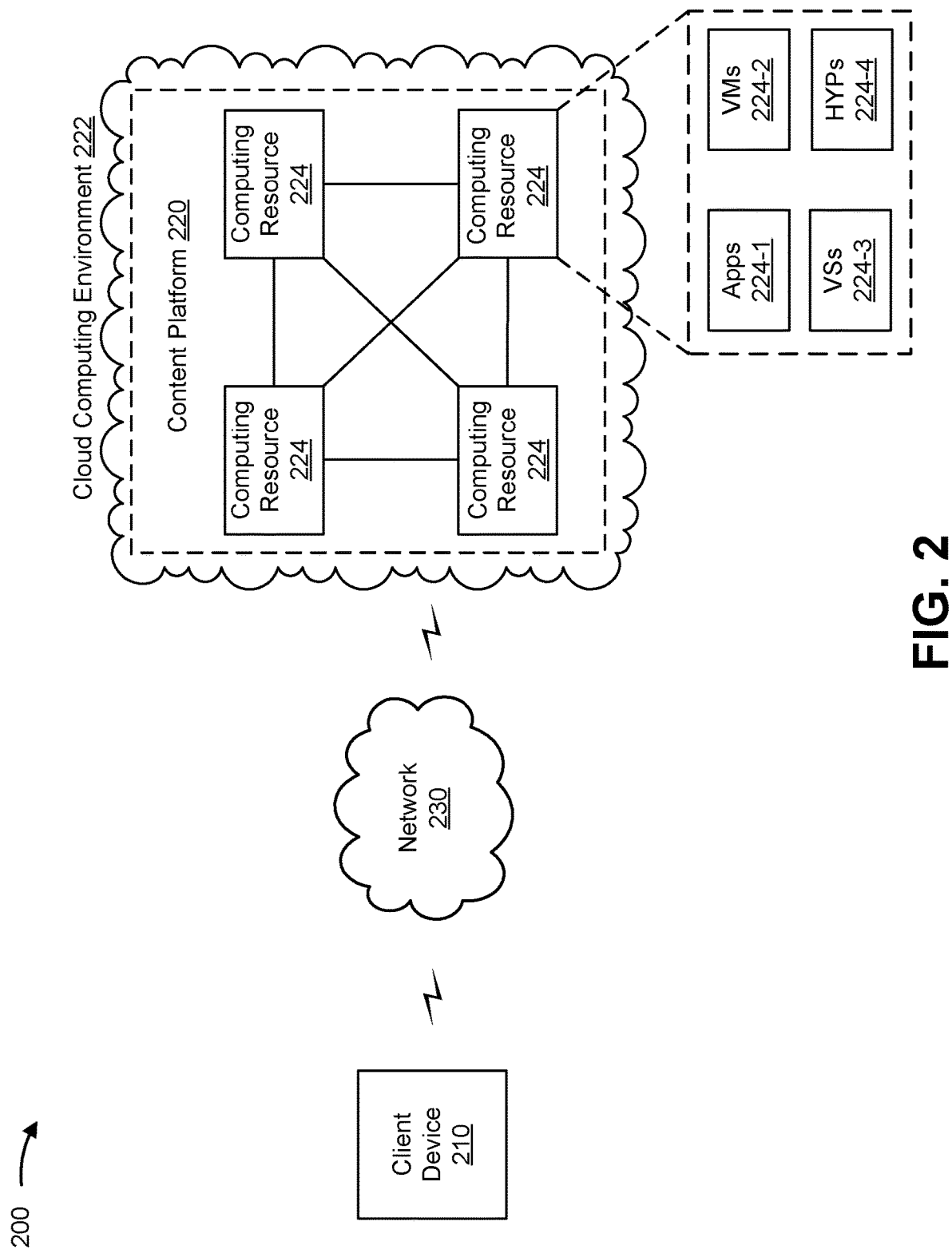
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a client device 210, a content platform 220, a cloud computing environment 222, a computing resource 224, and a network 230. Devices of environment 200 can interconnect via wired connections, wireless connections, or a combination of wired and wireless connections.

Client device 210 includes one or more devices capable of receiving, generating, storing, processing, and/or providing information associated with determining an end screen time for displaying an end screen user interface. For example, client device 210 can include a communication and/or computing device, such as a set-top box, a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a touch screen display, a monitor, a television, and/or a similar type of device. In some implementations, client device 210 can display on-demand content, such as on-demand movies, on-demand television shows, and/or other types of on-demand content. In some implementations, client device 210 can receive inputs from a user, such as user-initiated exit events associated with an on-demand content element. In some implementations, client device 210 can store information identifying a plurality of exit times associated with respective user-initiated exit events. In some implementations, client device 210 can display a GUI associated with an on-demand content service, can play an on-demand content element, can display an end screen user interface as an overlay on a playback of an on-demand content element, and/or the like.

Content platform 220 includes one or more computing resources capable of receiving, generating, storing, processing, and/or providing data associated with determining an end screen time for displaying an end screen user interface. For example, content platform 220 can be a platform implemented by cloud computing environment 222. In some implementations, content platform 220 is implemented by computing resources 224 of cloud computing environment 222. In some implementations, content platform 220 can store and/or provide access to various types of content, such as on-demand content associated with a plurality of on-demand content providers (e.g., on-demand movies, on-demand television shows, and/or the like), web-based content associated with the plurality of on-demand content providers (e.g., a web page associated with a particular on-demand content element, a home page associated with the on-demand content provider, and/or the like), and/or the like. In some implementations, content platform 220 can receive information identifying a plurality of exit times, in an on-demand content element, associated with respective user-initiated exit events, can determine an end screen time in the on-demand content element based on the plurality of exit times, can generate an instruction to display an end screen user interface at the end screen time during playback of the on-demand content element and/or the like.

Cloud computing environment 222 includes an environment that hosts content platform 220. Cloud computing environment 222 can provide computation, software, data access, storage, and/or other services that do not require end-user knowledge of a physical location and configuration of a system and/or a device that delivers the services. As shown, cloud computing environment 222 can include content platform 220 and computing resource 225.

Computing resource 224 includes one or more personal computers, workstation computers, server devices, or another type of computation and/or communication device. In some implementations, computing resource 224 can host content platform 220. The cloud resources can include compute instances executing in computing resource 224, storage devices provided in computing resource 224, data transfer devices provided by computing resource 224, and/or the like. In some implementations, computing resource 224 can communicate with other computing resources 224 via wired connections, wireless connections, or a combination of wired and wireless connections.

As further shown in FIG. 2, computing resource 224 can include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that can be provided to or accessed by client device 210. Application 224-1 can eliminate a need to install and execute the software applications on client device 210. For example, application 224-1 can include software associated with content platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of client device 210), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
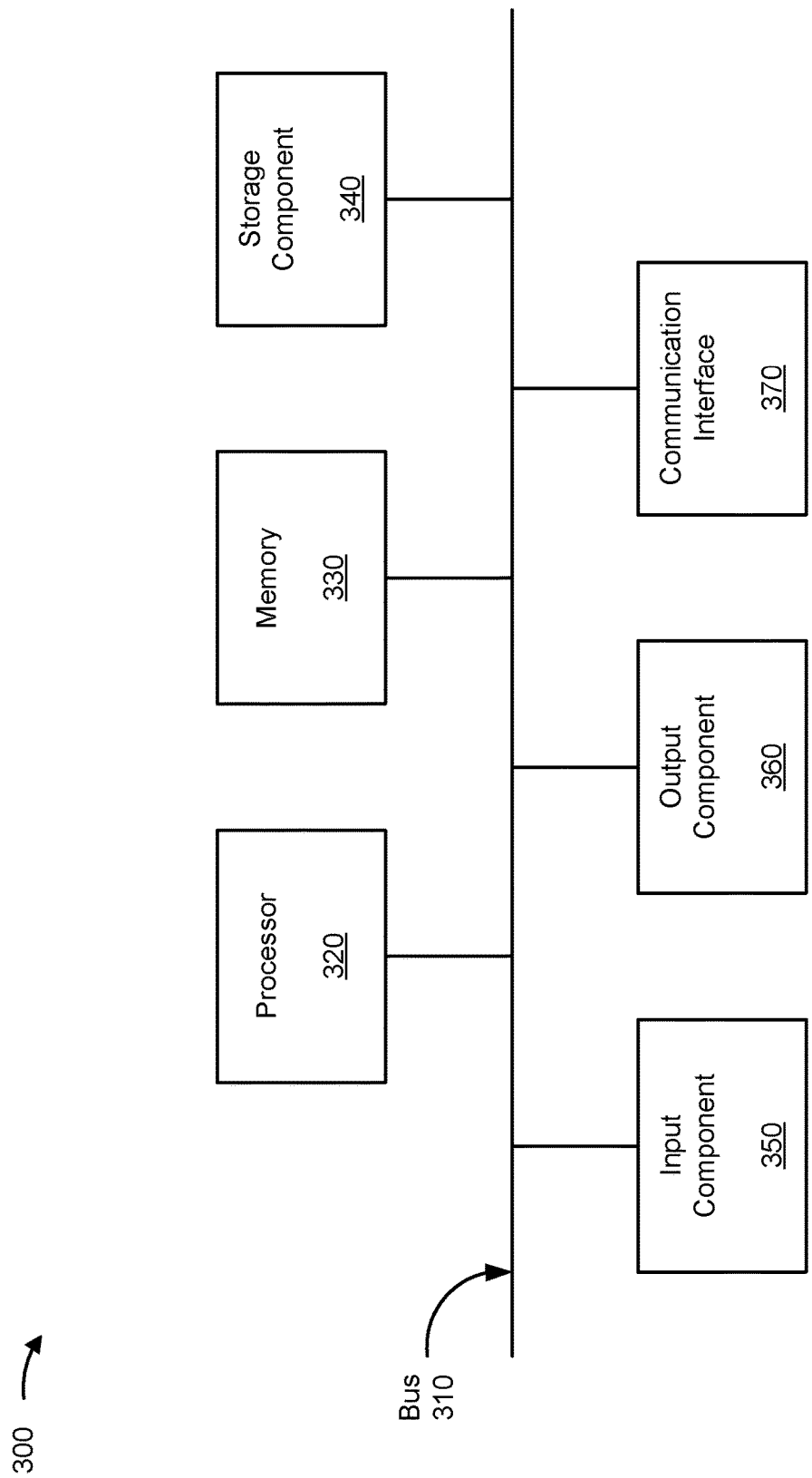
FIG. 3 is a diagram of example components of one or more devices of FIG. 2.

FIG. 3 is a diagram of example components of a device 300. Device 300 can correspond client device 210, content platform 220, computing resource 224, and/or one or more devices included in network 230. In some implementations, client device 210, content platform 220, computing resource 224, and/or one or more devices included in network 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
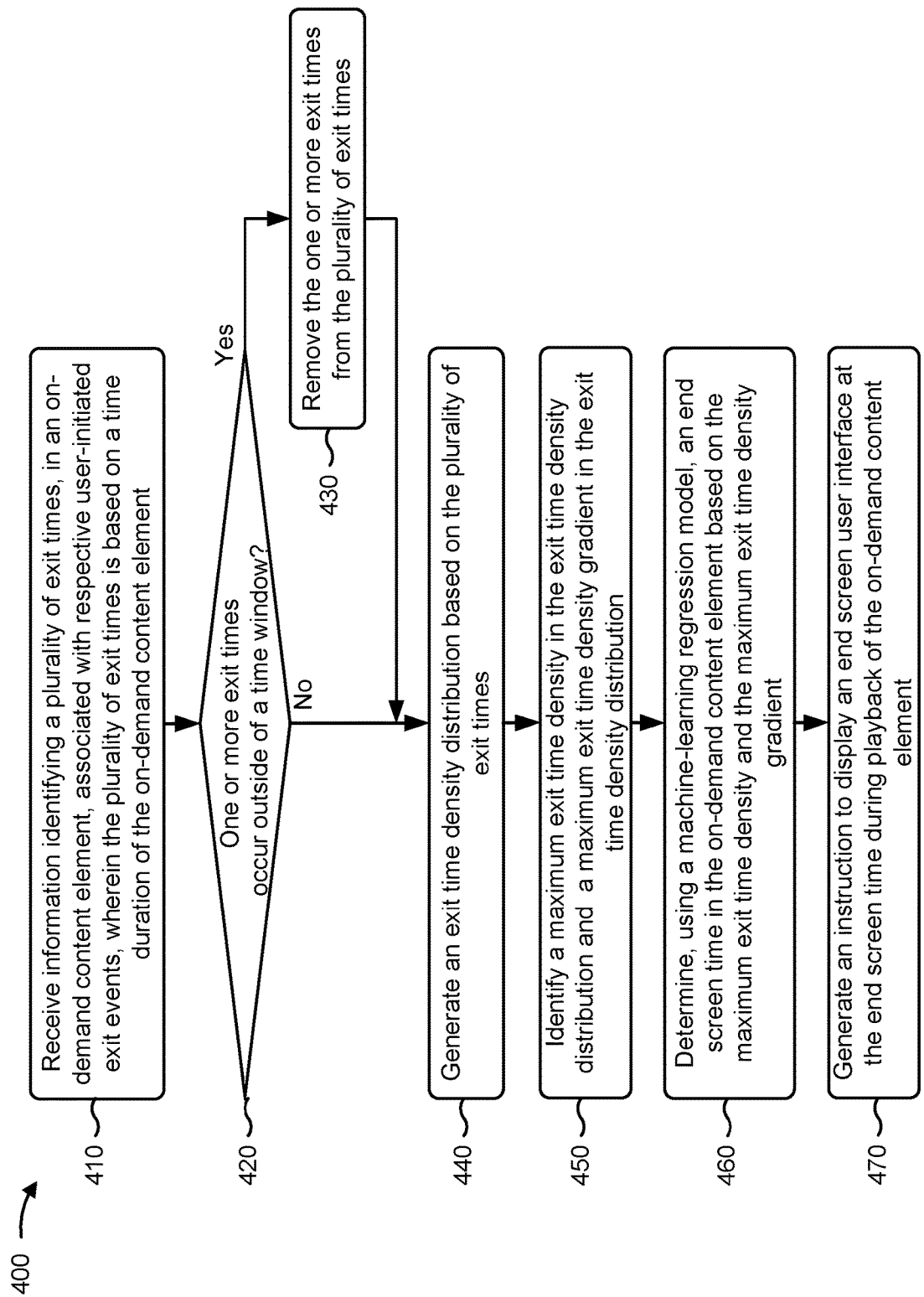
FIG. 4 is a flow chart of an example process for determining an end screen time for displaying an end screen user interface.

FIG. 4 is a flow chart of an example process 400 for determining an end screen time for displaying an end screen user interface. In some implementations, one or more process blocks of FIG. 4 can be performed by content platform (e.g., content platform 220). In some implementations, one or more process blocks of FIG. 4 can be performed by another device or a group of devices separate from or including the content platform, such as a client device (e.g., client device 210) and/or the like.

As shown in FIG. 4, process 400 can include receiving information identifying a plurality of exit times, in an on-demand content element, associated with respective user-initiated exit events, wherein the plurality of exit times is based on a time duration of the on-demand content element (block 410). For example, the content platform (e.g., using computing resource 224, processor 320, memory 330, storage component 340, input component 350, output component 360, communication interface 370, and/or the like) can receive information identifying a plurality of exit times, in an on-demand content element, associated with respective user-initiated exit events, as described above. In some aspects, the plurality of exit times is based on a time duration of the on-demand content element.

As further shown in FIG. 4, process 400 can include determining whether one or more exit times, of the plurality of exit times, occur outside of a time window in the on-demand content element (block 420). For example, the content platform (e.g., using computing resource 224, processor 320, memory 330, storage component 340, input component 350, output component 360, communication interface 370 and/or the like) can determine whether one or more exit times, of the plurality of exit times, occur outside of a time window in the on-demand content element, as described above.

As further shown in FIG. 4, if the content platform determines that the one or more exit times occur outside of the time window (block 420—Yes), process 400 can include removing the one or more exit times from the plurality of exit times (block 430). For example, the content platform (e.g., using computing resource 224, processor 320, memory 330, storage component 340, input component 350, output component 360, communication interface 370 and/or the like) can remove the one or more exit times from the plurality of exit times, as described above.

As further shown in FIG. 4, process 400 can include generating an exit time distribution based on the plurality of exit times (block 440). For example, the content platform (e.g., using computing resource 224, processor 320, memory 330, storage component 340, input component 350, output component 360, communication interface 370 and/or the like) can generate an exit time distribution based on the plurality of exit times, as described above. In some implementations, the content platform can generate the exit time distribution based on determining that the one or more exit times do not occur outside of the time window (block 420—No). In some implementations, the content platform can generate the exit time distribution after removing the one or more exit times from the plurality of exit times if the one or more exit times occur outside of the time window (block 420—Yes).

As further shown in FIG. 4, process 400 can include identifying a maximum exit time density in the exit time distribution and a maximum exit time density gradient in the exit time distribution (block 450). For example, the content platform (e.g., using computing resource 224, processor 320, memory 330, storage component 340, input component 350, output component 360, communication interface 370 and/or the like) can identify a maximum exit time density in the exit time distribution and a maximum exit time density gradient in the exit time distribution, as described above.

As further shown in FIG. 4, process 400 can include determining, using a machine-learning regression model, an end screen time in the on-demand content element based on the maximum exit time density and the maximum exit time density gradient (block 460). For example, the content platform (e.g., using computing resource 224, processor 320, memory 330, storage component 340, input component 350, output component 360, communication interface 370 and/or the like) can determine, using a machine-learning regression model, an end screen time in the on-demand content element based on the maximum exit time density and the maximum exit time density gradient; and, as described above.

As further shown in FIG. 4, process 400 can include generating an instruction to display an end screen user interface at the end screen time during playback of the on-demand content element (block 470). For example, the content platform (e.g., using computing resource 224, processor 320, memory 330, storage component 340, input component 350, output component 360, communication interface 370 and/or the like) can generate an instruction to display an end screen user interface at the end screen time during playback of the on-demand content element, as described above.

Process 400 can include additional implementations, such as any single implementation or any combination of implementations described below and/or in connection with one or more other processes described elsewhere herein.

In some implementations, process 400 can comprise determining, based on the time duration of the on-demand content element, a time window in the on-demand content element, and removing one or more exit times, from the plurality of exit times, based on the one or more exit times occurring outside of the time window in the on-demand content element. In some implementations, the exit time distribution comprises at least one of a histogram of the plurality of exit times, or a Kernel Density Estimation (KDE) of the plurality of exit times.

In some implementations, the machine-learning regression model comprises a linear machine-learning regression model. In some implementations, the linear machine-learning regression model comprises a sum of a first exit time, of the plurality of exit times, corresponding to the maximum exit time density and a second exit time, of the plurality of exit times, corresponding to the maximum exit time density gradient. In some implementations, the first exit time is multiplied by a first constant. In some implementations, the second exit time is multiplied by a second constant.

In some implementations, the end screen user interface comprises at least one of a display of a notification to initiate playback of another on-demand content element, a display of one or more suggested similar content elements, or a display of one or more suggested related content elements. In some implementations, a user-initiated exit event, of the respective user-initiated exit events, comprises at least one of an instruction, received from a user and at an on-demand device, to display a home screen of an on-demand user interface, or an instruction, received from the user and at the on-demand device, to display another on-demand content element.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a content platform, information identifying a plurality of exit times, in connection with an on-demand content element, associated with respective user-initiated exit events;
   generating, by the content platform, an exit time distribution based on the plurality of exit times;
   determining, by the content platform and using a machine-learning regression model, an end screen time in connection with the on-demand content element based on the exit time distribution; and
   transmitting, by the content platform, an instruction to display an end screen user interface at the end screen time during playback of the on-demand content element.

2. The method of claim 1, further comprising:
   identifying, by the content platform:
      a maximum exit time density in the exit time distribution, and
      a maximum exit time density gradient in the exit time distribution; and
   wherein determining the end screen time comprises:
      determining the end screen time based on:
         the maximum exit time density, and
         the maximum exit time density gradient.

3. The method of claim 2, wherein the machine-learning regression model comprises:
   a linear machine-learning regression model,
      wherein the linear machine-learning regression model includes:
         a first exit time, of the plurality of exit times, corresponding to the maximum exit time density,
         a second exit time, of the plurality of exit times, corresponding to the maximum exit time density gradient, and
         a bias term.

4. The method of claim 3, wherein the first exit time is multiplied by a first machine-learning regression model coefficient, and
   wherein the second exit time is multiplied by a second machine-learning regression model coefficient,
      wherein the first machine-learning regression model coefficient and the second machine-learning regression model coefficient are selected to penalize negative errors.

5. The method of claim 1, wherein the exit time distribution comprises at least one of:
   a histogram of the plurality of exit times, or
   a Kernel Density Estimation (KDE) of the plurality of exit times.

6. The method of claim 1, wherein the end screen user interface comprises at least one of:
   a display of a notification to initiate playback of another on-demand content element,
   a display of one or more suggested similar content elements, or
   a display of one or more suggested related content elements.

7. The method of claim 1, wherein a user-initiated exit event, of the respective user-initiated exit events, comprises at least one of:
   an instruction, received from a user and at an on-demand device, to display a home screen of an on-demand user interface, or
   an instruction, received from the user and at the on-demand device, to display another on-demand content element.

8. A content platform, comprising:
   one or more memories; and
   one or more processors communicatively coupled to the one or more memories, to:
      generate an exit time density distribution based on information identifying a plurality of exit times, in connection with an on-demand content element, associated with respective user-initiated exit events, wherein the plurality of exit times are based on a time duration of the on-demand content element;
      determine, using a machine-learning regression model, an end screen time in connection with the on-demand content element based on the exit time density distribution; and
      generate an instruction to display an end screen user interface at the end screen time during playback of the on-demand content element.

9. The content platform of claim 8, wherein the one or more processors are further to:
   identify:
      a maximum exit time density in the exit time density distribution, and
      a maximum exit time density gradient in the exit time density distribution; and
   wherein the one or more processors, when determining the end screen time are to:
      determine the end screen time based on:
         the maximum exit time density, and
         the maximum exit time density gradient.

10. The content platform of claim 9, wherein the machine-learning regression model comprises:
    a linear machine-learning regression model,
       wherein the linear machine-learning regression model includes:
          a first exit time, of the plurality of exit times, corresponding to the maximum exit time density, and
          a second exit time, of the plurality of exit times, corresponding to the maximum exit time density gradient.

11. The content platform of claim 10, wherein the first exit time is multiplied by a first machine-learning regression model coefficient, and
    wherein the second exit time is multiplied by a second machine-learning regression model coefficient,
       wherein the first machine-learning regression model coefficient and the second machine-learning regression model coefficient are selected to penalize negative errors.

12. The content platform of claim 8, wherein the one or more processors, when generating the exit time density distribution, are to at least one of:
    a histogram of the plurality of exit times, or a Kernel Density Estimation (KDE) of the plurality of exit times.

13. The content platform of claim 8, wherein the end screen user interface comprises at least one of:
 a display of a notification to initiate playback of another on-demand content element,
 a display of one or more suggested similar content elements, or
 a display of one or more suggested related content elements.

14. The content platform of claim 8, wherein a user-initiated exit event, of the respective user-initiated exit events, comprises at least one of:
 an instruction, received from a user and at an on-demand device, to display a home screen of an on-demand user interface, or
 an instruction, received from the user and at the on-demand device, to display another on-demand content element.

15. A non-transitory computer-readable medium storing instructions, the instructions comprising:
 one or more instructions that, when executed by one or more processors of a content platform, cause the one or more processors to:
  generate an exit time distribution based on identifying a plurality of exit times, in connection with an on-demand content element, associated with respective user-initiated exit events;
  determine, using a machine-learning regression model, an end screen time in connection with the on-demand content element based on the exit time distribution; and
  generate an instruction to display an end screen user interface at the end screen time during playback of the on-demand content element.

16. The non-transitory computer-readable medium of claim 15, wherein the plurality of exit times is based on a time duration of the on-demand content element.

17. The non-transitory computer-readable medium of claim 15, wherein the one or more instructions, when executed by the one or more processors, further cause the one or more processors to:
 identify:
  a maximum exit time density in the exit time distribution, and
  a maximum exit time density gradient in the exit time distribution; and
 wherein the one or more instructions, that cause the one or more processors to determine the end screen time, further cause the one or more processors to:
  determine the end screen time based on:
   the maximum exit time density, and
   the maximum exit time density.

18. The non-transitory computer-readable medium of claim 17, wherein the machine-learning regression model comprises:
 a linear machine-learning regression model,
  wherein the linear machine-learning regression model includes:
   a first exit time, of the plurality of exit times, corresponding to the maximum exit time density, and
   a second exit time, of the plurality of exit times, corresponding to the maximum exit time density gradient.

19. The non-transitory computer-readable medium of claim 18, wherein the first exit time is multiplied by a first machine-learning regression model coefficient, and
 wherein the second exit time is multiplied by a second machine-learning regression model coefficient,
  wherein the first machine-learning regression model coefficient and the second machine-learning regression model coefficient are selected to penalize negative errors.

20. The non-transitory computer-readable medium of claim 15, wherein the end screen user interface comprises at least one of:
 a display of a notification to initiate playback of another on-demand content element,
 a display of one or more suggested similar content elements, or
 a display of one or more suggested related content elements.

* * * * *